United States Patent
Dotan et al.

(10) Patent No.: US 9,838,355 B1
(45) Date of Patent: Dec. 5, 2017

(54) COLLABORATIVE ANALYTICS FOR INDEPENDENTLY ADMINISTERED NETWORK DOMAINS

(71) Applicant: EMC IP Holding Company LLC, Hopkinton, MA (US)

(72) Inventors: Yedidya Dotan, Newton, MA (US); Brian P. Girardi, Chantilly, VA (US); Marcelo Blatt, Modiin (IL); Oleg Freylafert, Had Hasharon (IL); Kevin D. Bowers, Melrose, MA (US); Michael S. Shreve, Falls Church, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/276,072

(22) Filed: Sep. 26, 2016

Related U.S. Application Data (63) Continuation of application No. 14/501,892, filed on Sep. 30, 2014, now Pat. No. 9,467,343.

(51) Int. Cl.
*H04L 29/06* (2006.01)
*H04L 12/24* (2006.01)

(52) U.S. Cl.
CPC .......... *H04L 63/02* (2013.01); *H04L 63/1433* (2013.01); *H04L 63/20* (2013.01); *H04L 41/14* (2013.01)

(58) Field of Classification Search
CPC ..... H04L 63/02; H04L 63/20; H04L 63/1433; H04L 41/14
See application file for complete search history.

(56) References Cited

U.S. PATENT DOCUMENTS

| | | | |
|---|---|---|---|
| 4,309,569 A | 1/1982 | Merkle | |
| 7,634,557 B2 | 12/2009 | Moore et al. | |
| 7,716,739 B1 * | 5/2010 | McCorkendale | G06F 21/55 726/23 |
| 8,176,169 B2 | 5/2012 | Moore et al. | |
| 2013/0254880 A1 * | 9/2013 | Alperovitch | G06F 21/51 726/22 |

(Continued)

OTHER PUBLICATIONS

"Merkle Hash Trees for Distributed Audit Logs" Karthikeyan Bhargavan, Apr. 7, 2015, http://pauillac.inria.fr/~fpottier/X/INF441/projects/merkle/merkle.pdf.*

(Continued)

*Primary Examiner* — Catherine Thiaw
*Assistant Examiner* — Thomas Ho
(74) *Attorney, Agent, or Firm* — Ryan, Mason & Lewis, LLP (57) ABSTRACT

A method includes receiving a first analytics set performed on a first network security appliance operated internal to a first organization, receiving a second analytics set performed on a second network security appliance operated internal to a second organization, processing the first analytics set and the second analytics set, and responsive to the processing, disseminating to the second network security appliance information indicating that the second analytics set has also been performed on at least the first network security appliance, without revealing an identity of the first organization. In one embodiment at least part of the first analytics set or the second analytics set is hashed.

20 Claims, 7 Drawing Sheets

(56) References Cited

U.S. PATENT DOCUMENTS

| | | | | |
|---|---|---|---|---|
| 2013/0282810 | A1* | 10/2013 | Lessin | G06Q 50/01 |
| | | | | 709/204 |
| 2014/0208426 | A1* | 7/2014 | Natarajan | H04L 63/1416 |
| | | | | 726/23 |
| 2014/0380473 | A1* | 12/2014 | Bu | G06F 21/53 |
| | | | | 726/23 |
| 2015/0172311 | A1* | 6/2015 | Freedman | H04L 63/1433 |
| | | | | 726/1 |
| 2016/0088011 | A1* | 3/2016 | Johri | H04L 63/1441 |
| | | | | 726/23 |
| 2016/0373433 | A1* | 12/2016 | Rivers | H04L 63/0823 |

OTHER PUBLICATIONS

Decandia et al., "Dynamo: Amazon's Highly Available Key-value Store", SOSP '07, Oct. 4-17, 2007, pp. 205-220.

* cited by examiner

| Navigate | Events | Malware Analysis | |
|---|---|---|---|
| | | | |
| 2014 04/01 17:42 (+00:00) | | | |
| | | | |

◎ ⌄ Remote Session ID 🔍
    Closed - Click to Open

◎ ⌄ Decoder Source (1 value) 🔍
    ds-hyb-01.nwlabs.local (8,752,901)

⚠ ⌄ Risk: Informational (2 values) 🔍 ← 410
    bing search (19) - google search (17)

⚠ ⌄ Risk: Suspicious (1 value) 🔍
    suspicious:ssl self signed (>100,000 - 36%)

FIG.4A

⇆ ⌄ Service Type (1 value) 🔍
    HTTP (19)

www ⌄ Hostname Aliases (1 value) 🔍
    www.bing.com (19)

⦻ ⌄ Source IP Address (9 values) 🔍
    137.69.130.171 (5) - 137.69.131.80 (4) - 137.69.131.86 (2)
              ↖ 420

COLLABORATIVE ANALYTICS FOR INDEPENDENTLY ADMINISTERED NETWORK DOMAINS

This application is a continuation of U.S. application Ser. No. 14/501,892, filed Sep. 30, 2014, which is incorporated herein by reference in its entirety.

TECHNICAL FIELD

The present disclosure relates to information security, and more specifically to collaborative security analysis of analytical data shared by members of a community.

BACKGROUND

Typical security analysis approaches rely heavily on structured messaging and manual processes that struggle to keep up with a changing threat landscape. The sooner an analyst understands the scope of a potential threat and/or incident, the more effective a given response can be. In today's threat environment it is clear that working collaboratively with peers in the security industry provides a stronger knowledge and defense against adversaries. In this context, "crowdsourcing," a relatively recent addition to the technology lexicon, refers to collaborative efforts of a community to solve common problems or address common issues. In the world of data security analytics, crowdsourcing can have significant advantages. However, concerns regarding revealing sensitive corporate information in such collaborative environments often preclude participation in such collaborative efforts.

SUMMARY

In accordance with an one embodiment, a method includes receiving a first analytics set performed on a first network security appliance operated internal to a first organization, receiving a second analytics set performed on a second network security appliance operated internal to a second organization, processing the first analytics set and the second analytics set, and responsive to the processing, disseminating to the second network security appliance information indicating that the second analytics set has also been performed on at least the first network security appliance, without revealing an identity of the first organization. In one implementation at least part of the first analytics set or the second analytics set is hashed. An apparatus including a processor, a network interface, and memory storing logic instructions configured to perform the method is also described.

DESCRIPTION OF EXAMPLE EMBODIMENTS

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

The techniques described herein are directed to sharing information without sharing underlying sensitive information on which shared information is based. Upon review of this disclosure and appreciation of the concepts disclosed herein, the ordinarily skilled artisan will recognize other contexts in which the present inventive concept can be applied. The scope of the present invention is intended to encompass all such alternative implementations.

As those skilled in the art appreciate, network security analytics appliances gather and maintain a wealth of valuable telemetry within one or more administrative network domains. This telemetry, or, more generally, "analytics" or "information" is often mixed with personally identifiable information (PII) and other proprietary data that is preferably not exposed externally. Such other proprietary information might include, but is not limited to, e.g., internal Internet Protocol (IP) addresses, server types, web browsing habits, trends, email communicants, etc.

Embodiments described herein enable network administrators, who are members of a collaborative network security infrastructure, to obtain insight into what their peers are experiencing when performing security analysis. This knowledge provides a powerful dimension of context that can be harnessed to speed resolution of network security incidents. As will be explained in more detail below, and as an introduction to the instant description, network security appliances can be configured to maintain audit logs of what administrators within a given administrative domain look at and analyze. For example, an administrator might, in connection with an analysis of a given communication session, select a given IP address, then click on a host, then look at email, etc. This user analytical telemetry can be a significant source of intelligence that can be the basis for helpful recommendations to the greater community of security analysts and administrators.

Figure 1:
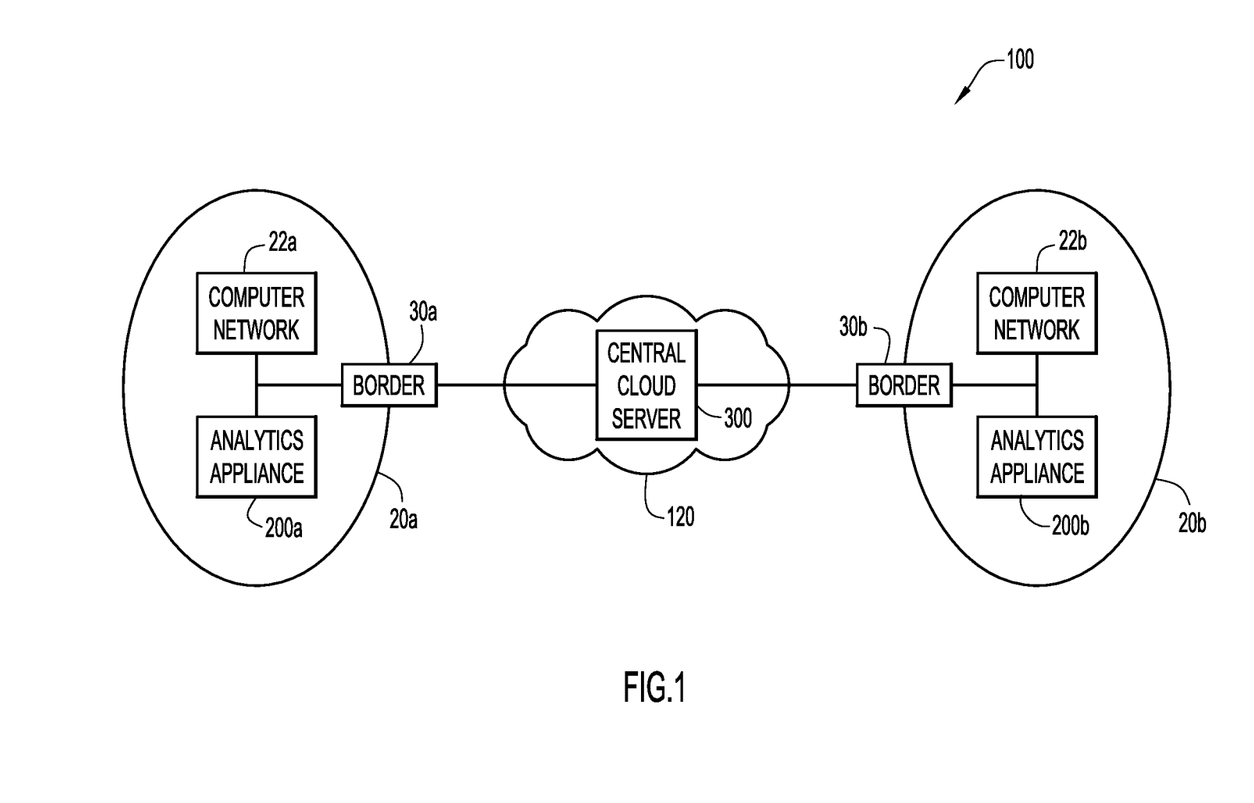
FIG. 1 is a schematic block diagram of a communication network in which an embodiment of the present general inventive concept may be incorporated.

FIG. 1 is a block diagram of an example embodiment of the present invention, referred to herein as collaborative analytics system 100. As will be explained more fully below, collaborative analytics system 100 implements a crowd-sourcing framework by which member organizations of a collaborative community can obtain community-wide network security analytical information from organization-specific network security analytical information shared to the community by individual member organizations. For purposes of this disclosure, an "organization" is any goal-seeking entity that utilizes a computer network to transact with an external environment.

Exemplary collaborative analytics system 100 comprises administrative network domains 20a, 20b, representatively referred to herein as administrative network domain(s) 20, or simply "network domain(s)" 20, in which respective member organizations of the collaborative community operate. As used herein, an "administrative network domain," or "network domain," 20 is a combination of computing and telecommunications resources that form and support an internal computer network 22a, 22b (generally, 22) with a corresponding border apparatus 30a, 30b (generally, 30), e.g., a firewall. A "border," as used herein, is a network traffic demarcation separating each network domain 20 from other computer networks to which they are connected. The border of a network domain may be defined by security policies established by an administrative authority within an organization.

Security policies may be enforced at border 30 on the flow of network traffic between the internal network and the external networks. "Security policies," as used herein, are constraint specifications established by an administrative authority within an organization.

As further shown in FIG. 1, analytics appliances 200a, 200b (generally, 200) are also part of the respective network domains 20a, 20b. In the depicted implementation, each network domain 20 is in communication with a larger wide area network 120, which may be, e.g., the Internet. A central cloud server 300 is accessible to each of the analytics appliances 200 via wide area network 120. As will be explained in more detail below, a function of analytics appliance 200 is to monitor computer network 22 within each network domain 20 and, as appropriate, supply central cloud server 300 with information about network traffic, metadata, telemetry, network security events or analysis detected by or performed by analytics appliance 200 or a user thereof. Central cloud server 300 is configured to thereafter process, compare, etc. the information received, and provide feedback to respective analytics appliances 200 for the ultimate benefit of users or administrators of those analytics appliances 200.

It is to be understood that while the embodiments described herein are directed to network security analysis on collected network traffic characterizing metadata, the present invention is not so limited. Upon review of this disclosure, those having skill in information analytics will recognize numerous analysis targets and collected telemetry for which the present invention can be embodied without departing from the spirit and intended scope thereof.

As is evident from in FIG. 1, collaborative analytics system 100 may be implemented through a hub and spoke network topology having central cloud server 300 as the hub to which network domains 20 are connected through the spokes. In certain embodiments, an appropriately authorized entity within each organization may establish a corresponding account on central cloud server 300.

Figure 2:
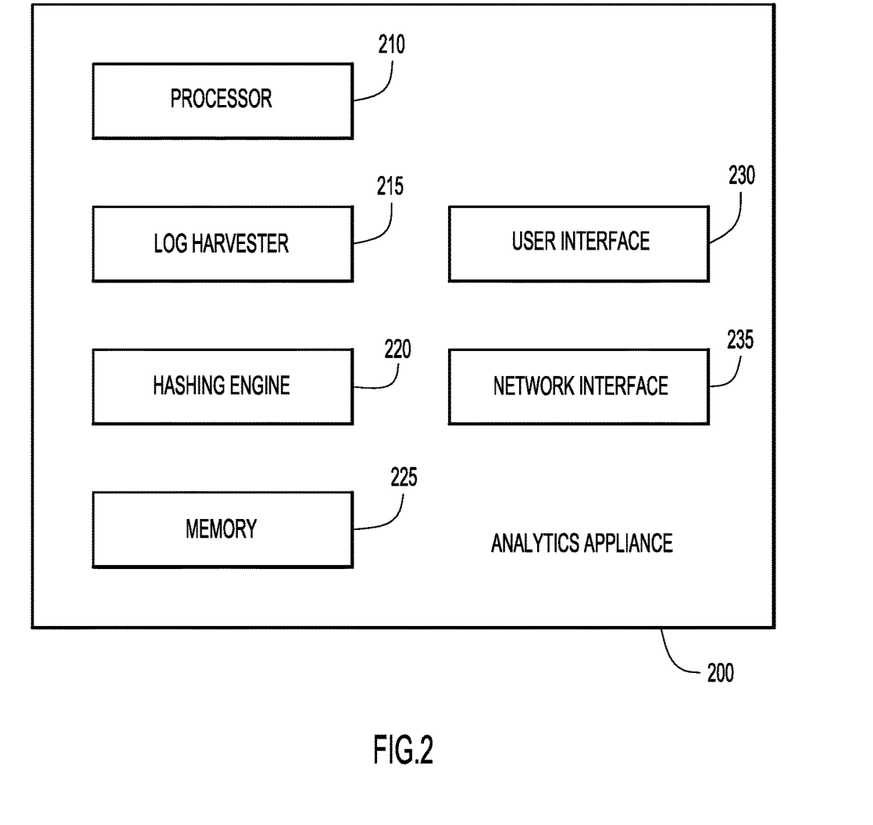
FIG. 2 is a schematic block diagram of a collaborative analytics appliance by which the present general inventive concept can be embodied.

FIG. 2 is a schematic block diagram of an exemplary analytics appliance 200 in accordance with the present general inventive concept. Analytics appliance 200 comprises a processor 210, a log harvester 215, a hashing engine 220, a memory 225, a user interface 230 and a network interface 235.

Processor 210 may be a general purpose processor, microprocessor, or the like, capable of executing logic or software instructions stored in memory 225 and/or in any of the other modules depicted in FIG. 2. Memory 225 may comprise read only memory (ROM), random access memory (RAM), magnetic disk storage media devices, optical storage media devices, flash memory devices, electrical, optical, or other physical/tangible (e.g., non-transitory) memory storage devices. In general, memory 225 may comprise one or more tangible (non-transitory) computer readable storage media (e.g., a memory device) encoded with logic, e.g., software comprising computer executable instructions and when the software is executed (by processor 210) it is operable to perform the operations described herein.

As noted above, analytics appliance 200 is preferably configured to capture user interaction and network events and log each such interaction and event in, e.g., memory 225. Events (e.g., user interface selections, mouse clicks, etc.) are preferably stored in the sequence detected. Log harvester 215 is configured to obtain individual or combinations of logs stored in memory 225 and provide the same to hashing engine 220, which provides a hash of the user event sequence for use by central cloud server 300. More detail regarding this aspect of the present invention is provided below.

User interface 230 may comprise a display, keyboard and mouse (not shown) among other input/output devices. User interface 230 should also be considered to comprise any graphical user interface (GUI) presented to or displayed for a user or administrator. Network interface 235 may comprise, e.g., a network interface card having, e.g., a unique media access control (MAC) address by which analytics appliance 200 can communicate with central cloud server 300.

One system that may be employed as analytics appliance is described in U.S. Pat. No. 8,176,169, entitled "Method for Network Visualization," and filed Apr. 29, 2002 ("the '169 patent"), although the present invention is not limited to any particular network data visualization implementation. The disclosure of the '169 patent is incorporated herein by reference in its entirety. The '169 patent discloses a method of visualizing network data by parsing a collection of packets in accordance with a set of categories related to characteristics of the collection of packets, the categories including listings of categorical elements, wherein at least some of the categorical elements are selectable by a user. When a categorical element is selected by a user, the collection of packets is filtered in accordance with the selected categorical element. That is, an analytics appliance in accordance with the '169 patent enables a user or administrator to "drill down" into selected communications sessions by any number of categories including IP address, communication type, and host name, among others.

Figure 3:
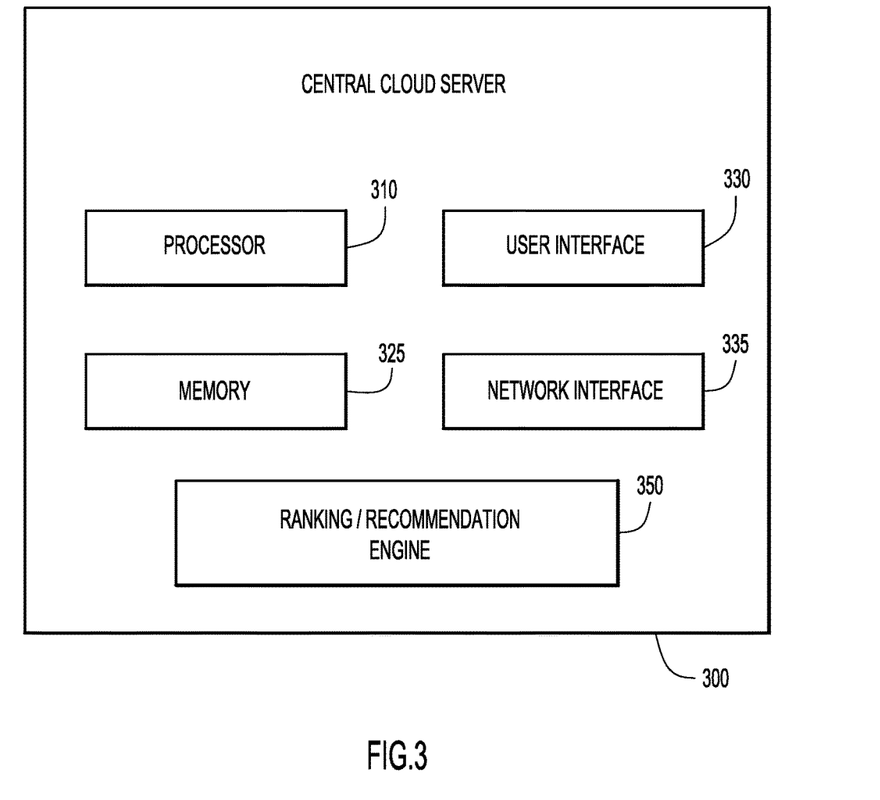
FIG. 3 is a schematic block diagram of a central cloud server by which the present general inventive concept can be embodied.

FIG. 3 is a schematic diagram of central cloud server 300. Central cloud server 300 comprises a processor 310, a memory 325, a user interface 330, a network interface 335 and a ranking/recommendation engine 350.

Similar to analytics appliance 200, in central cloud server 300, processor 310 may be a general purpose processor, microprocessor, or the like, capable of executing logic or software instructions stored in memory 325 and/or in any of the other modules depicted in FIG. 3. Memory 325 may comprise read only memory (ROM), random access memory (RAM), magnetic disk storage media devices, optical storage media devices, flash memory devices, electrical, optical, or other physical/tangible (e.g., non-transitory) memory storage devices. In general, memory 325 may comprise one or more tangible (non-transitory) computer readable storage media (e.g., a memory device) encoded with logic, e.g., software comprising computer executable instructions and when the software is executed (by processor 310) it is operable to perform the operations described herein.

User interface 330 may comprise a display, keyboard and mouse (not shown) among other input/output devices. User interface 330 should also be considered to comprise any graphical user interface (GUI) presented to or displayed for a user or administrator of central cloud server 300. Network interface 335 may comprise, e.g., a network interface card having a unique media access control (MAC) address by which central cloud server 300 can communicate with any one of the network domains 20, and more specifically, respective analytics appliances 200 deployed in those network domains.

Ranking/recommendation engine 350 enables central cloud server 300 to determine whether alerts, notifications, recommendations and the like should be disseminated to a second analytics appliance 200b in response to information received (in a hashed format) from a first analytics appliance 200a. That is, central cloud server 300, in accordance with embodiments described herein, receives streams of information in at least a partially hashed format from a plurality of analytics appliances 200 respectively monitoring network events and administrator usage. Ranking/recommendation engine 300 in central cloud server 300 is configured to analyze the received streams (or "analytics" or "analytics sets") and rank them in terms of, e.g., severity, importance, or velocity, among other criteria. Alerts, notifications or recommendations may then be sent to other analytics appliances 200 in view of the processing performed by ranking/recommendation engine 350 and/or operations being performed on individual analytics appliances 200.

Figure 4A:
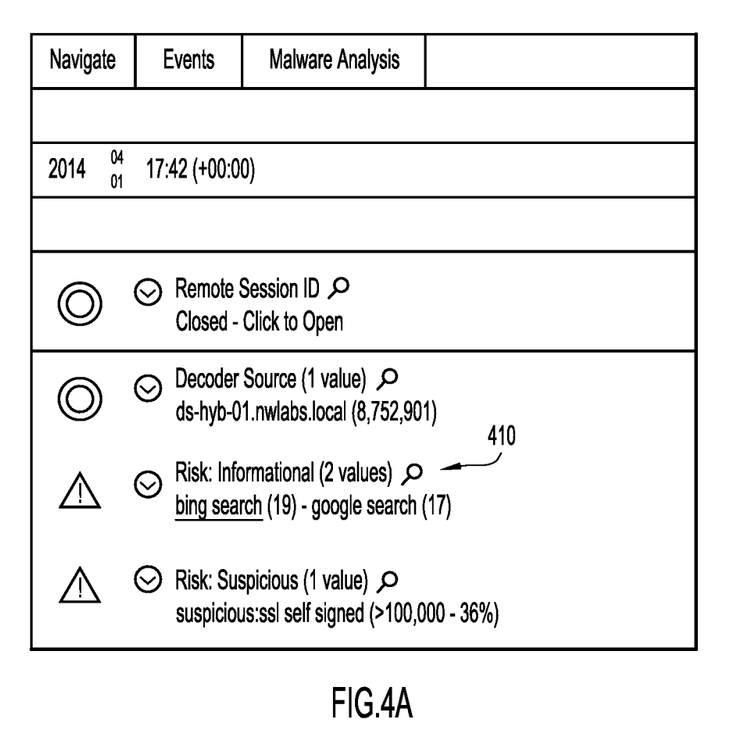
FIGS. 4A-4C are depictions of several exemplary graphical user interfaces via which analyses are performed by a user or administrator on an analytics appliance in accordance with the present general inventive concept.
Figure 4B:
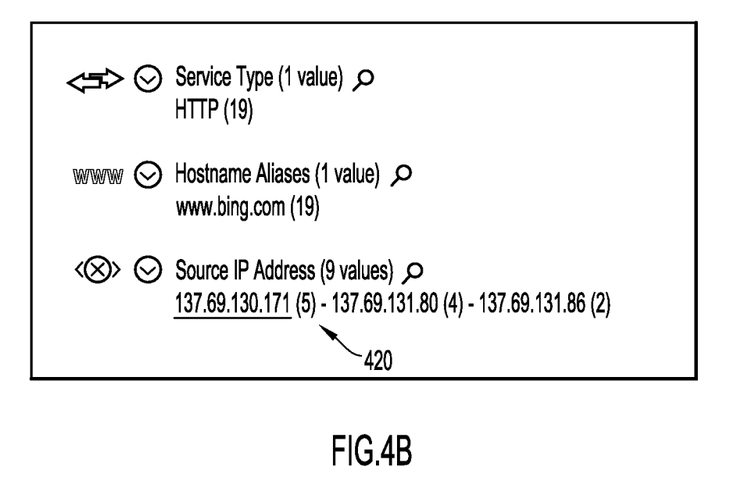
Figure 4C:
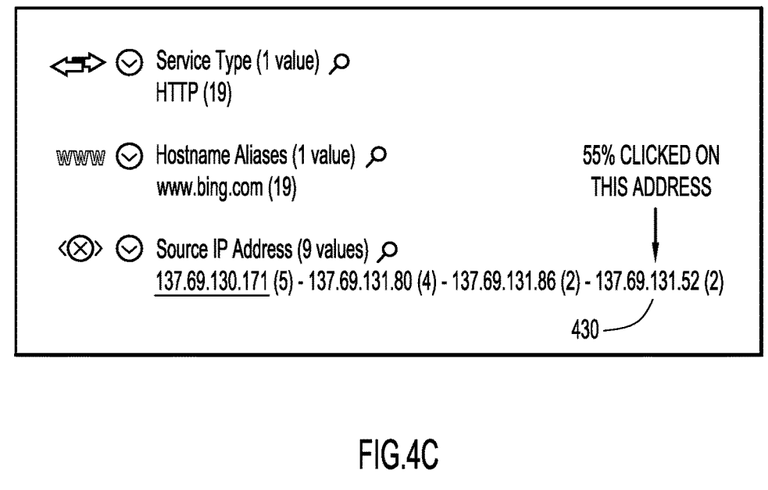

FIGS. 4A-4C are depictions of several exemplary graphical user interfaces via which analyses may be performed by a user or administrator on analytics appliance 200 in accordance with the present general inventive concept. More specifically, in this particular example, FIG. 4A depicts a user interface that enables a user or analyst to determine or monitor who within a given network domain in which analytics appliance 200 is deployed has used the search engine "bing."

By clicking on or selecting the link "bing search" at 410 in the user interface of FIG. 4A, the user interface of FIG. 4B is generated. This user interface identifies which source IP addresses have accessed bing (perhaps over a predetermined time period), and presents them in the order of which IP addresses accessed bing the most to which IP addresses accessed bing the least, as indicated by 420, with the depicted parenthetical numbers indicating the number of times the respective IP address accessed bing.

Notably, the actions of clicking on or selecting of various links within each user interface is recorded as logs by analytics appliance 200 and, as will be explained, a hashed representation of the log is passed to central cloud server 300 for further analysis and use.

For example, the sequence of clicks within analytics appliance 200 produces a "breadcrumb" trail, i.e., a sequence of actions, which represents and provides insight into what a given administrator's analysis sessions comprise, by capturing what that administrator was researching. Selected information that might be considered suspicious (e.g., IP address and domains) is then hashed and then supplied to central cloud server 300. Significantly, even though certain information is hashed or hidden, it is possible from the perspective of central cloud server 300 to generate, from that received data, information for other users including, e.g., how many other administrators investigated a particular domain, or how many other administrators clicked a given value after entering a given search string. Central cloud server 300 can also be configured to abstract to one level above, such as IP country or domain suffix.

With reference now to FIG. 4C, by capturing hashed versions of the analysis logs, it is possible to aggregate the same at central cloud server 300 and deduce that, for instance, 55% of administrators or users clicked on a given source IP address, as indicated at 430. This is the type of information that can be gleaned from receipt of analytics information supplied to central cloud server 300 from a plurality of analytics appliances 200. Although hashing has been described herein as a means for obfuscating information sent to central cloud server 300, other obfuscating approaches may be employed. That is, any one-way function could provide the sort of protection that may desired. For example, searchable or homomorphic encryption could also be employed, depending on the application. Blinding (in the cryptographic sense) could also prove valuable.

Figure 5:
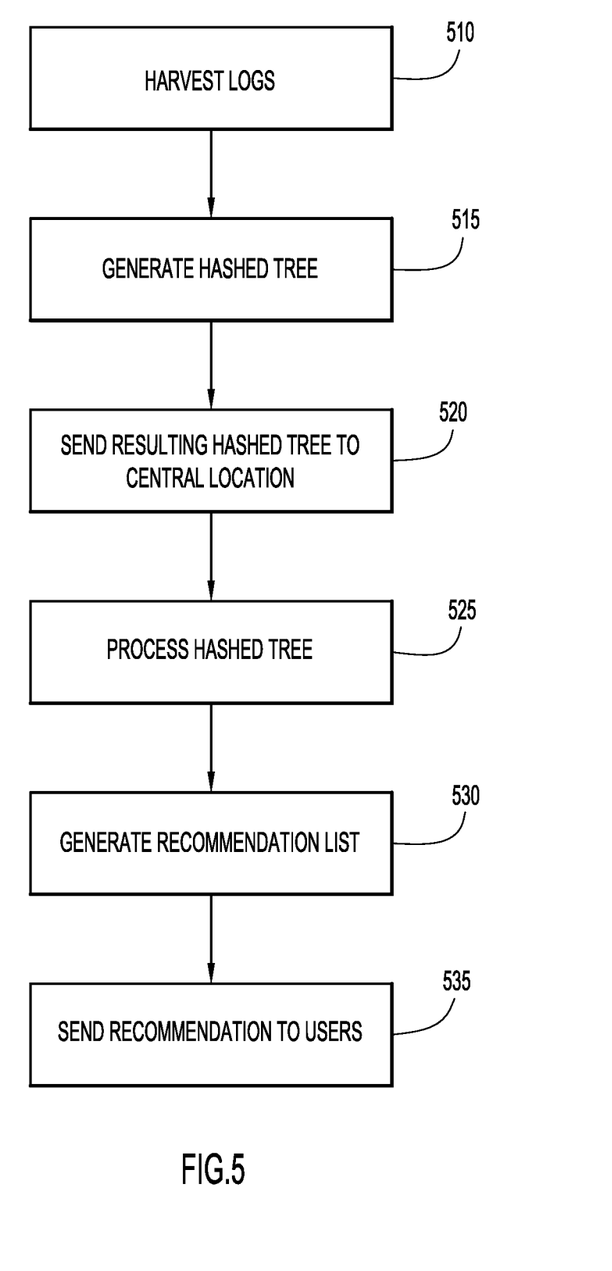
FIG. 5 is a flowchart of an exemplary sequence of steps in accordance with an embodiment of the present general inventive concept.

Reference is now made to FIG. 5, which depicts an exemplary process flowchart in accordance with the present inventive concept. At 510, logs are harvested from memory of an analytics appliance that is configured to enable an administrator to monitor events that have transpired in a network. The administrator is able to drill down into a database of these events, and resulting logs of the administrator's activities are harvested in this step. At 515, the logs so harvested are organized into a search tree, portions of which may be hashed. A Merkel tree is one possible implementation by which the logs may be organized in a search tree. Lead values for such a tree may be values representative of a user token and a time, e.g., a time when a certain analysis session commenced. By including a user token, ranking/recommendation engine 350 can base recommendations on, e.g., the reputation of given users. By including time based values, stale analytics sets can be purged over time from within central cloud server 300.

At 520 the generated hashed tree is sent to a central location, e.g., central cloud server 300. At 525, the hashed trees received from a plurality of analytics appliances are processed, e.g., compared with one another or otherwise analyzed. In light of the comparison and/or other analysis, at 530 a recommendation or list of recommendations is generated. Such recommendation(s) may then, at 535, be sent to respective analytics appliances.

Figure 6:
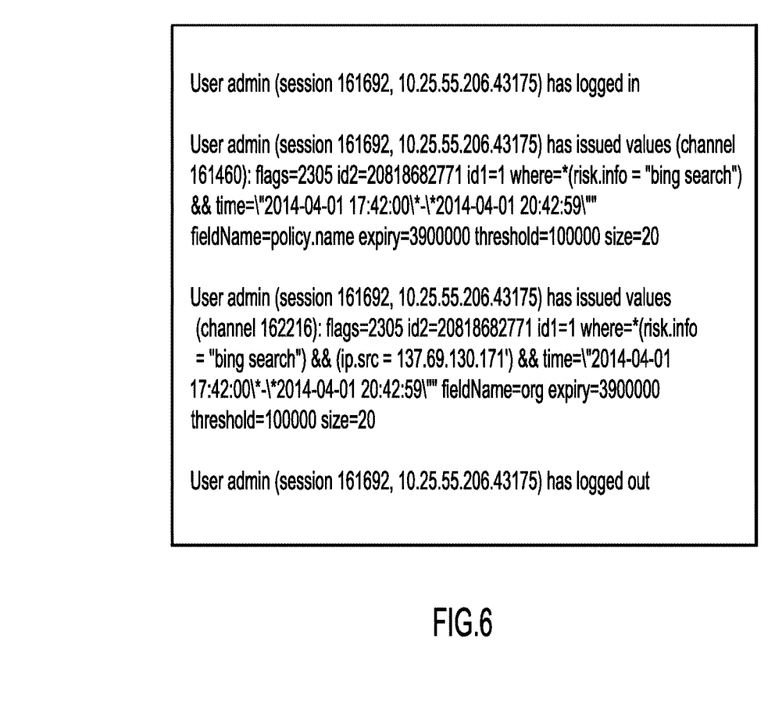
FIG. 6 depicts exemplary logs resulting from user operation of an analytics appliance in accordance with the present general concept.

FIG. 6 depicts exemplary logs resulting from user operation of an analytics appliance 200 in accordance with the present general concept. As show in the figure, a user logs in. Thereafter, the user selects links and values in connection with investigating network events. As shown, the user selected "bing search" for a particular time range. In a next operation, the log indicates that the user has further drilled down or filtered on a particular IP address, namely 137.69.130.171. See FIG. 4B which is consistent with the indicated log. Eventually, the user logs out.

Figure 7:
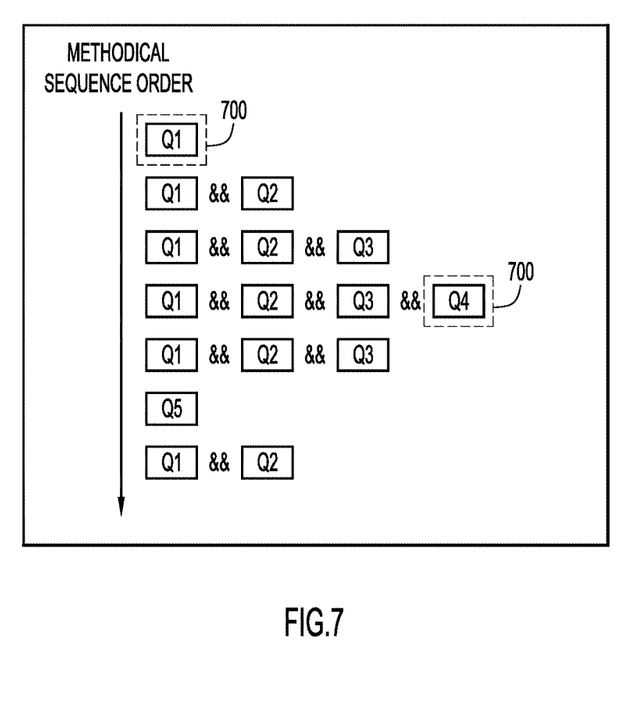
FIG. 7 is a conceptual diagram of data formatting operations that can be implemented in embodiments of the present general inventive concept.

FIG. 7 is a conceptual diagram of data formatting operations that can be implemented in embodiments of the present general inventive concept. In this figure, the logs that are captured by analytics appliance 200 are arranged in a tree. Each entry in the tree may be considered a query Q. Thus, in the first column, Q1 might be, e.g., an identification of a user, e.g., a user token. Q2 might be, e.g., the log or query resulting from the bing search. Q3 might be the log or query resulting from a particular IP address selection. Q4 and Q5 may be yet other user drill down selections or query inputs. This tree, or other format of analytics information, is passed to central cloud server 300 for analysis and comparison. Notably, as indicated by broken lines 700, some of the values in the tree may be hashed. For instance, if Q1 represents a user, perhaps that user does not want the fact that his selections are going to be made public within the community. As such, his user token may be hashed. Similarly, Q4 may be hashed, where Q4 may be a particular internal host name or IP address, which the user does not want exposed externally. Thus this value may also be hashed and reported to central cloud server 300.

As an example, suppose a first administrator operates a first analytics appliance 200a in accordance with a first sequence of queries/drill downs. This sequence of queries is then passed to central cloud server 300. Subsequently, a second administrator operates a second analytics appliance 200b in accordance with a second sequence of queries/drill downs. Two scenarios are enabled by embodiments of the present invention.

In a first scenario, even before second administrator begins his analytics session, ranking/recommendation engine 350 may send the second administrator an alert or notification regarding the type of analysis or investigation the second administrator might want to undertake. Such a notification may be based, for example, on the reputation of the first administrator. That is, if the first administrator is considered an expert in the field, the second administrator can then benefit from such expertise. Whether a notification or alert is sent to the second administrator may be based on a ranking of the analytics performed by the first administrator in comparison to other administrators. That is, among a plurality of analytics received from a plurality of analytics appliances 200, perhaps only a subset thereof may be considered of sufficient quality or utility to disseminate to other administrators or users. Rankings may be based, for example, on historical successes of respective administrators in identifying security breaches or issues relevant to the community at-large.

In a second scenario, as the second administrator begins making selections, analytics appliance 200b may immediately communicate that input to central cloud server 300, which may then immediately return a recommended subsequent selection. This could be implemented via a pop up window in user interface 230 of analytics appliance 200b. In another possible implementation, when a user begins a session of analytics, analytics appliance 200 may be configured to invoke a representational state transfer (REST) call requesting the most common operation of the day (e.g., source IP, internal address, domains, etc.)

In sum, a log collection system harvests logs on an analytics appliance machines. Click values from those logs are (at least partially) hashed, and sent to a central server that will, in turn, analyze the data and return recommendations in the form of specific analyses to perform, or more general recommendations. Users may also obtain additional information regarding a given recommendation. In this regard, recommendations may contain a tag that will enable an administrator to obtain enhanced/additional information upon request, including possibly putting administrators directly in touch with one another.

Stated alternatively, as an administrator or user uses analytics appliance 200, an audit trail of his interests is recorded. Each such audit trail (or click, selection, input) may be transformed into a set profile. Profiles may include, for example, IP address-pairs, IP-port pairs, hostnames, URLs, etc. Profiles may be put through a cryptographic hash function to protect the data, which is then transferred to a centralized analytics system in the cloud. The centralized analytics system performs analytics, statistics, and summarizations on the collection of hashes across the contributors, and results of such processing are made available for query to the contributors. Notably, the centralized analytics system never receives the actual profiles, and is thus not privy to the underlying data likely considered sensitive by the contributors. As the administrator or user continues his analysis, a small window or text alert may be displayed informing him that, e.g., "40 other users saw the same communicants" or "based on metrics, we recommend you click on IP 2.3.4.5" or "the session you are looking at trended heavily last week, would you like to contact affected parties?" The end result is the user benefits from crowd-sourced analytics automatically, without compromising his identity or data. Embodiments may also be configured to support an opportunity for 1-on-1 collaboration if warranted. In a preferred implementation, the foregoing processing and recommendations are ongoing and occur in real-time.

Thus, the present inventive concept provides a method comprising receiving a first analytics set performed on a first network security appliance operated internal to a first organization, receiving a second analytics set performed on a second network security appliance operated internal to a second organization, processing the first analytics set and the second analytics set, and responsive to the processing, disseminating to the second network security appliance information indicating that the second analytics set has also been performed on at least the first network security appliance, without revealing an identity of the first organization.

In one embodiment, at least part of the first analytics set or the second analytics set is hashed. The first analytics set may comprise an indication of activity of a network administrator responsible for network security for the first organization. The activity of the network administrator may be presented as an audit trail.

In accordance with a possible implementation, disseminating to the second network security appliance information indicating that the second analytics set has also been performed by at least the first network security appliance, is performed without revealing an identity of the first organization, and by sending an alert to the second network security appliance.

The method further includes receiving a message from the second network security appliance in response to the alert. In one embodiment, the first analytics set and the second analytics set indicate at least one of an order in which an administrator performed individual operations of the analytics set, or a velocity at which the administrator performed individual operations of the analytics set.

The method may still further include creating a recommendation for network administrators other than network administrators of the first organization and the second organization, the recommendation being based on the first analytics set or the second analytics set. In one implementation, creating the recommendation is based on a reputation of a network administrator who generated the first analytics set or the second analytics set.

The first analytics set and the second analytics set may be organized in a search tree, such as a Merkel tree.

Certain embodiments of the present general inventive concept provide for the functional components to manufactured, transported, marketed and/or sold as processor instructions encoded on non-transitory computer-readable media. The present general inventive concept, when so embodied, can be practiced regardless of the processing platform on which the processor instructions are executed and regardless of the manner by which the processor instructions are encoded on the computer-readable medium.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method comprising:
  receiving, at a central server from a first network security appliance, a first analytics set performed on the first network security appliance operated internal to a first organization;
  processing, at the central server, the first analytics set to obtain a recommended subsequent analytics selection;
  receiving, at the central server from a second network security appliance, an initial analytics selection associated with a second analytics set performed on the second network security appliance operated internal to a second organization;
  responsive to receiving the initial analytics selection, disseminating from the central server to the second network security appliance the recommended subsequent analytics selection, without revealing an identity of the first organization;
  wherein at least a portion of the first analytics set is organized in a search tree, the search tree comprising a lead value and an audit trail, the lead value representing a user token and a time, the user token being associated with one or more network administrators of the first organization performing one or more actions in the audit trail, the time being associated with performance of the one or more actions in the audit trail; and
  wherein the recommended subsequent analytics selection is based at least in part on: (i) a reputation of the one or more network administrators associated with the user token; and (ii) the time associated with performance of the one or more actions in the audit trail.

2. The method of claim 1, wherein at least part of the first analytics set or the initial analytics selections is hashed.

3. The method of claim 1, wherein the first analytics set comprises an indication of activity of at least one network administrator responsible for network security for the first organization.

4. The method of claim 1, wherein disseminating to the second network security appliance the recommended subsequent analytics selection, without revealing an identity of the first organization comprises sending an alert to the second network security appliance.

5. The method of claim 4, further comprising receiving a message from the second network security appliance in response to the alert.

6. The method of claim 1, wherein the first analytics set and the initial analytics selection indicate at least one of an order in which the one or more network administrators performed individual operations of the first analytics set or the initial analytics selection, or a velocity at which the one or more network administrators performed individual operations of the first analytics set or the initial analytics selection.

7. The method of claim 1, further comprising creating a recommendation for network administrators other than network administrators of the first organization and the second organization, the recommendation being based on the first analytics set or the initial analytics selection.

8. The method of claim 7, wherein creating the recommendation is based on a reputation of the one or more network administrators who generated the first analytics set or the initial analytics selection.

9. The method of claim 1, further comprising organizing the initial analytics selection in another search tree.

10. The method of claim 1, wherein the search tree comprises a Merkle tree.

11. An apparatus configured to share security analytics among a plurality of security network appliances deployed in respective network domains, the apparatus comprising:
  a processor;
  a network interface configured to receive a first analytics set and an initial analytics selection associated with a second analytics set from, respectively, a first network domain and a second network domain; and
  a memory, storing logic instructions, which, when executed by the processor, are configured to:
    process the first analytics set to obtain a recommended subsequent analytics selection; and
    in response to receiving the initial analytics selection, disseminate to the second network domain the recommended subsequent analytics selection, without revealing an identity of the first network domain;
  wherein at least a portion of the first analytics set is organized in a search tree, the search tree comprising a lead value and an audit trail, the lead value representing a user token and a time, the user token being associated with one or more network administrators of the first organization performing one or more actions in the audit trail, the time being associated with performance of the one or more actions in the audit trail; and
  wherein the recommended subsequent analytics selection is based at least in part on: (i) a reputation of the one or more network administrators associated with the user token; and (ii) the time associated with performance of the one or more actions in the audit trail.

12. The apparatus of claim 11, wherein at least part of the first analytics set or the initial analytics selection is hashed.

13. The apparatus of claim 11, wherein the first analytics set comprises an indication of activity of at least one network administrator responsible for network security for the first network domain.

14. The apparatus of claim 11, wherein the logic instructions, which, when executed by the processor, are further configured to send an alert to the second network domain.

15. The apparatus of claim 14, wherein the logic instructions, which, when executed by the processor, are further configured to receive a message from the second network domain in response to the alert.

16. The apparatus of claim 11, wherein the first analytics set and the initial analytics selection comprise at least one of an order in which the one or more network administrators performed security analytics, or a velocity at which the one or more network administrators performed security analytics.

17. The apparatus of claim 11, wherein the logic instructions, which, when executed by the processor, are further configured to create a recommendation to network administrators other than network administrators of the first organization and the second organization, the recommendation being based on the first analytics set or the initial analytics selection.

18. A computer program product comprising a non-transitory computer-readable storage medium having stored therein program code of one or more software programs, wherein the program code when executed by at least one processing device causes the at least one processing device:
- to receive, from a first network security appliance, a first analytics set performed on the first network security appliance operated internal to a first organization;
- to process the first analytics set to obtain a recommended subsequent analytics selection;
- to receive, from a second network security appliance, an initial analytics selection associated with a second analytics set performed on the second network security appliance operated internal to a second organization;
- responsive to receiving the initial analytics selection, to disseminate to the second network security appliance the recommended subsequent analytics selection, without revealing an identity of the first organization;
- wherein at least a portion of the first analytics set is organized in a search tree, the search tree comprising a lead value and an audit trail, the lead value representing a user token and a time, the user token being associated with one or more network administrators of the first organization performing one or more actions in the audit trail, the time being associated with performance of the one or more actions in the audit trail; and
- wherein the recommended subsequent analytics selection is based at least in part on: (i) a reputation of the one or more network administrators associated with the user token; and (ii) the time associated with performance of the one or more actions in the audit trail.

19. The computer program product of claim 18, wherein the first analytics set and the initial analytics selection comprise at least one of an order in which the one or more network administrators performed security analytics, or a velocity at which the one or more network administrators performed security analytics.

20. The computer program product of claim 18, wherein the program code when executed by the at least one processing device further causes the at least one processing device to create a recommendation for network administrators other than network administrators of the first organization and the second organization, the recommendation being based on the first analytics set or the initial analytics selection.

* * * * *